United States Patent
Guo et al.

(10) Patent No.: US 9,992,547 B2
(45) Date of Patent: Jun. 5, 2018

(54) METHOD FOR ADJUSTING BACKLIGHT BRIGHTNESS OF TELEVISION AND BOX FOR ADJUSTING BACKLIGHT BRIGHTNESS OF TELEVISION

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Caixia Guo, Beijing (CN); Qinqin Cao, Beijing (CN); Wanli Xu, Beijing (CN); Bendeng Lv, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/101,177

(22) PCT Filed: Jan. 6, 2016

(86) PCT No.: PCT/CN2016/070255
§ 371 (c)(1),
(2) Date: Jun. 2, 2016

(87) PCT Pub. No.: WO2017/020545
PCT Pub. Date: Feb. 9, 2017

(65) Prior Publication Data
US 2017/0195738 A1   Jul. 6, 2017

(30) Foreign Application Priority Data
Aug. 4, 2015   (CN) .......................... 2015 1 0472407

(51) Int. Cl.
*H04N 5/57*   (2006.01)
*H04N 5/58*   (2006.01)
(Continued)

(52) U.S. Cl.
CPC ... *H04N 21/4854* (2013.01); *H04N 21/42204* (2013.01); *H04N 21/43635* (2013.01)

(58) Field of Classification Search
CPC .................................. H04N 5/57; H04N 5/58
(Continued)

(56) References Cited

U.S. PATENT DOCUMENTS

2003/0055722 A1\* 3/2003 Perreault ............ G06Q 30/0215
705/14.17
2005/0057487 A1   3/2005 Takata et al.
(Continued)

FOREIGN PATENT DOCUMENTS

CN         1929572 A      3/2007
CN       100373425 C      3/2008
(Continued)

OTHER PUBLICATIONS

International Search Report and Written Opinion dated Mar. 31, 2016: PCT/C2016/070255.
(Continued)

*Primary Examiner* — Dominic D Saltarelli
(74) *Attorney, Agent, or Firm* — Ladas & Parry LLP

(57) ABSTRACT

Provided are a method for adjusting backlight brightness of a television by a box and a box for adjusting backlight brightness of a television. The box includes a user interface controlling module and a command transmitting module. The method includes: triggering the user interface controlling module in response to a signal input from the outside; and the command transmitting module transmitting an adjusting command to the television. The method and the box according to embodiments of the present disclosure can adjust the backlight brightness of a television by interaction between a box and the television based on the user's need.

14 Claims, 3 Drawing Sheets

(51) Int. Cl.
*H04N 21/485* (2011.01)
*H04N 21/4363* (2011.01)
*H04N 21/422* (2011.01)

(58) Field of Classification Search
USPC .......................................... 348/576, 602, 603
See application file for complete search history.

(56) References Cited

U.S. PATENT DOCUMENTS

| | | | |
|---|---|---|---|
| 2007/0057914 | A1 | 3/2007 | Park |
| 2009/0123084 | A1 | 5/2009 | Yang |
| 2010/0050005 | A1* | 2/2010 | Fujiwara .................. H04N 5/63 |
| | | | 713/320 |

FOREIGN PATENT DOCUMENTS

| | | |
|---|---|---|
| CN | 101640767 A | 2/2010 |
| CN | 201479277 U | 5/2010 |
| CN | 102932612 A | 2/2013 |
| CN | 103024489 A | 4/2013 |
| CN | 104093055 A | 10/2014 |
| CN | 104506916 A | 4/2015 |
| CN | 105187869 A | 12/2015 |
| EP | 1 691 546 A1 | 8/2006 |

OTHER PUBLICATIONS

The First Chinese Office Action dated Sep. 22, 2017; Appln. 201510472407.9.
The Second Chinese Office Action dated Apr. 2, 2018; Appln. No. 201510472407.9.

* cited by examiner

METHOD FOR ADJUSTING BACKLIGHT BRIGHTNESS OF TELEVISION AND BOX FOR ADJUSTING BACKLIGHT BRIGHTNESS OF TELEVISION

TECHNICAL FIELD OF THE DISCLOSURE

The present disclosure relates to a method for adjusting backlight brightness of a television and a box for adjusting backlight brightness of a television.

BACKGROUND

Currently, televisions have been widely spread. Televisions developed from the black and white ones to the colorful ones, and from the electronic tube or transistor ones quickly to the integrated circuit ones. Recently, televisions are developing toward intelligentization, digitization and multi-functionalization.

A display screen is the main display tool for a television to present pictures to a user. Generally, the higher the brightness of the display screen, the brighter the displayed colors and the better the display effect. However, if the brightness is too high, the displayed colors will be too bright, the power consumption will be too high, and harsh feeling will result in to tired human eyes. If the brightness is too low, the displayed colors will be too dark, which is also disadvantageous for long time watching. In order to improve readability of the display screen and release visual fatigue, the brightness of the display screen should be adjustable. The backlight brightness of the television directly decides the average brightness of the display screen. The brightness of the display screen can be adjusted by adjusting the backlight brightness of the television. Adjustable backlight brightness makes the produced televisions more environmentally friendly and energy saving, and can also improve visual experience of images.

Current technologies for dynamically adjusting backlight of a television are all directly adjusting the backlight brightness after performing simple statistics of brightness or gray scale information based on the content of the pictures.

In addition, in the age of internet, a solo television cannot meet the requirement of a user on network applications, but replacement with intelligent machines is costly. Therefore, a set-top box is an inevitable product with the development of times. The box in combination with the television enriches network resources for the user. For example, when promoting digital televisions in many places, top-set boxes are usually provided to users for free to attract consumers. The top-set box can receive digital content including electronic program guide, internet web pages and caption, among others, in addition to images and sound which can be provided by analog televisions. By using a top-set box, the user can watch digital television programs on an existing television, and can carry out interactive digital entertainment, education and business activities via the internet.

However, at present, the box and the television perform function operations and parameter adjustment separately, which decreases the user's experience. In the market, most of the solutions for adjusting backlight of a television are directly adjusting the backlight brightness after performing simple statistics of brightness or gray scale information based on the content of the pictures, and basically, the box cannot realize the function of adjusting the backlight brightness of the television. At the same time, the user cannot adjust the backlight brightness of the television according to his needs.

SUMMARY

One aspect of the present disclosure provides a method for adjusting backlight brightness of a television through a box, the box comprising a user interface controlling module and a command transmitting module, the method comprising: triggering the user interface controlling module in response to a signal input from the outside; and the command transmitting module transmitting an adjusting command to the television.

Before transmitting the adjusting command to the television, the command transmitting module determines whether it is connected to the television, and transmits the adjusting command to the television if the determining result is yes.

The signal input from the outside is corresponding to a triggering event.

The triggering event comprises a user touching a remote of the box, and a user touching the display screen of the television.

Different adjusting commands are corresponding to different backlight brightness values.

The command transmitting module transmitting the adjusting command comprises the command transmitting module transmitting the adjusting command containing the backlight brightness value corresponding to the triggering event.

The adjusting command transmitted by the command transmitting module is transmitted to the television via HDMI.

Pin 13 of HDMI is defined as a transmitting terminal, and pin 14 of HDMI is defined as a receiving terminal.

The box is a set-top box.

Another aspect of the present disclosure provides a box for adjusting backlight brightness of a television, comprising: a user interface controlling module, configured to be triggered in response to a signal input from the outside; and a command transmitting module communicatively connected to the user interface controlling module, configured to transmit an adjusting command to the television.

Before transmitting the adjusting command to the television, the command transmitting module determines whether it is connected to the television, and transmits the adjusting command to the television if the determining result is yes.

The signal input from the outside is corresponding to a triggering event.

The triggering event comprises a user touching a remote of the box, and a user touching the display screen of the television.

Different adjusting commands are corresponding to different backlight brightness values.

The command transmitting module transmitting the adjusting command comprises the command transmitting module transmitting the adjusting command containing the backlight brightness value corresponding to the triggering event.

The adjusting command transmitted by the command transmitting module is transmitted to the television via HDMI.

Pin 13 of HDMI is defined as a transmitting terminal, and pin 14 of HDMI is defined as a receiving terminal.

The box is a set-top box.

The method and the box according to embodiments of the present disclosure can adjust the backlight brightness of a television by interaction between a box and the television based on the user's need.

DETAILED DESCRIPTION

In the following, clearly and completely description on technical solutions in embodiments of the present disclosure will be described in connection with figures in the embodiments of the present disclosure. Obviously, the described embodiments are only part but not all of the embodiments of the present disclosure. Based on the embodiments of the present disclosure, all other embodiments obtained by those skilled in the art without creative work fall in the protection scope of the present disclosure.

Figure 1:
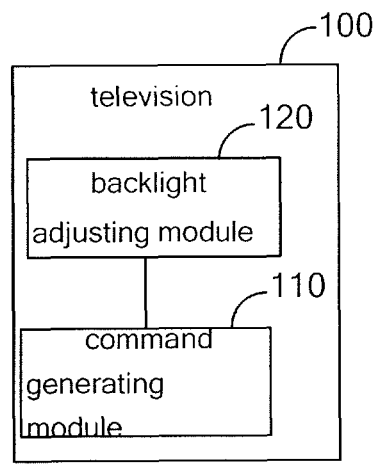
FIG. 1 is a block diagram which simply illustrates known modules in a television for adjusting the backlight of the television.

FIG. 1 is a block diagram which simply illustrates known modules in a television for adjusting the backlight of the television. As shown in FIG. 1, the modules in television 100 for adjusting the backlight of the television mainly comprise a command generating module 110 and a backlight adjusting module 120. The command generating module 110 and the backlight adjusting module 120 are communicatively connected. The command generating module 110 generates an adjusting command containing a backlight brightness value after performing simple statistics of brightness and gray scale information based on the content of the pictures, and transmits the adjusting command to the backlight adjusting module 120. The backlight adjusting module 120 adjusts the backlight of the television 100 to corresponding brightness based on the adjusting command.

It should be realized that the above-described method for adjusting backlight brightness is well-known by those skilled in the art, and will be not described in detail herein.

It should be noted that the block diagram in FIG. 1 only illustrates necessary modules for realizing backlight brightness adjustment in a television. Obviously, the television can comprise modules for realizing other functions of television known in the art.

Figure 2:
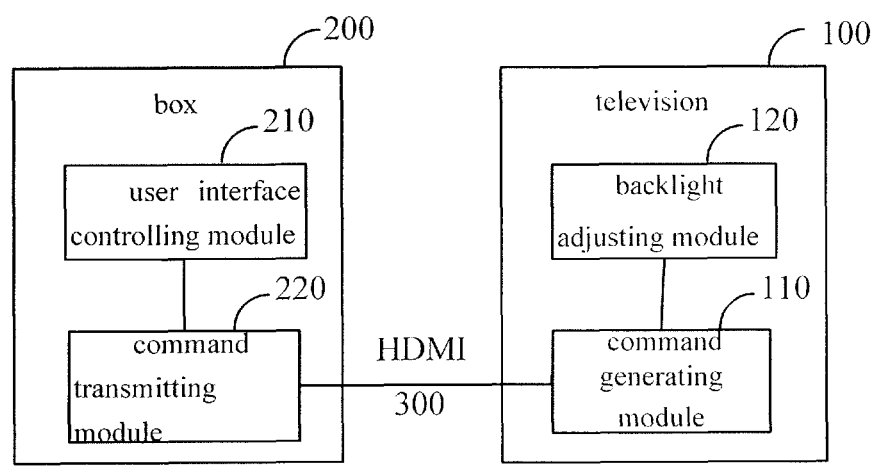
FIG. 2 is a block diagram for illustrating a specific structure of a box which can adjust backlight brightness of a television according to an embodiment of the present disclosure and its connection relationship with the television.

FIG. 2 is a block diagram for illustrating a specific structure of a box 200 which can adjust backlight brightness of a television according to an embodiment of the present disclosure and its connection relationship with the television 100 shown in FIG. 1. As shown in FIG. 2, the box 200 comprises a user interface controlling module 210 and a command transmitting module 220. The user interface controlling module 210 and the command transmitting module 220 in the box 200 are communicatively connected. For example, the command transmitting module 220 is connected to the television through high definition multimedia interface (HDMI) 300. For example, the command transmitting module 220 is communicatively connected to the command generating module 110 of the television trough HDMI 300. HDMI is a full digital video and sound transmission interface, which can transmit audio and video signals simultaneously. Since audio and video signals employ the same cable, the installation of the system is significantly simplified. In the present disclosure, pin 13 of HDMI is defined as a transmitting terminal and pin 14 is defined as a receiving terminal in order to realize communication between the box and the television.

The user interface controlling module 210 is configured to be triggered in response to a signal input from the outside. The signal input from the outside is corresponding to a triggering event. For example, the triggering event can comprise a user touching a remote of the box, a user touching the display screen of the television, or the like. As a specific example, for example, the user can trigger the user interface controlling module 210 by touching numerical keys on the remote of the box.

The command transmitting module 220 is configured to transmit an adjusting command to the television 100 after the user interface controlling module 210 is triggered.

Different adjusting commands are corresponding to different backlight brightness values. For example, the backlight brightness values can be divided into 12 levels or another number of levels. For example, if the backlight brightness value is divided into 12 levels, different adjusting commands are corresponding to backlight brightness values of any integer value between 0 and 12 respectively.

The command transmitting module 220 transmitting the adjusting command can comprise the command transmitting module 220 transmitting the adjusting command containing the backlight brightness value corresponding to the triggering event. The trigger even can for example be a user touching a remote of the box, a user touching the display screen of the television, or the like, as described in the above. For example, the triggering event is the user touching numerical key "5" on the remote. After the user triggers the user interface controlling module 210 through the above triggering event, the command transmitting module 220 transmits the adjusting command which contains a backlight brightness value "5" corresponding to the triggering event that the user triggers the numerical key "5" on the remote of the box.

The command transmitting module 220 is communicatively connected to the command generating module 110 of the television 100 through HDMI 300. The adjusting command transmitted by the command transmitting module 220 is transmitted to the command generating module 110 of the television 100 through HDMI 300. Pin 13 of HDMI is defined as the transmitting terminal, and pin 14 is defined as the receiving terminal.

At the television side, now the command generating module 110 of the television 100 can be taken as a command receiving module to only receive the adjusting command from the command transmitting module 220 and transmit it to the backlight adjusting module 120.

The backlight adjusting module 120 of the television 100 adjusts the backlight of the display screen of the television 100 to corresponding brightness based on the adjusting command. For example, if the adjusting command is the adjusting command containing a backlight brightness value "5" as described in the above, the backlight adjusting module 120 adjusts the backlight of the display screen of the television 100 to brightness corresponding to the backlight brightness value "5" based on the adjusting command.

It should be realized that the operation and backlight brightness adjusting method of the above modules at the television side are well known in the art, which will not be described in detail herein.

The box described herein can be ally known box, such as a set-top box or the like.

It should be noted that FIG. 2 only illustrates necessary modules for realizing backlight brightness adjustment in a box. Obviously, the box can also comprise modules for realizing other functions of a box known in the art.

The box according to an embodiment of the present disclosure can adjust the backlight brightness of a television by interaction between a box and existing modules in the television based on the user's need.

Figure 3:
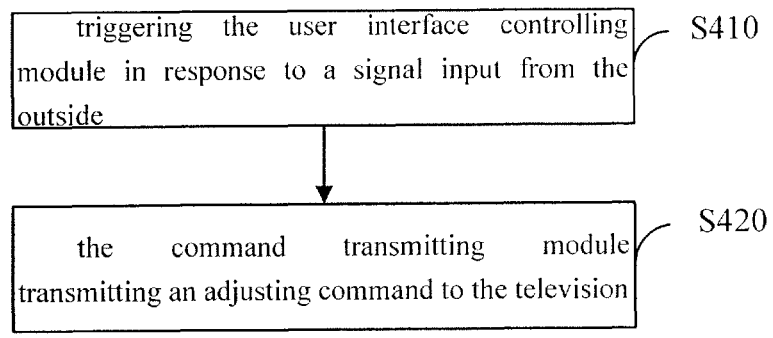
FIG. 3 is a flowchart of a method for adjusting backlight brightness of a television through a box according to an embodiment of the present disclosure.

FIG. 3 illustrates a flowchart of a method 400 for adjusting backlight brightness of a television according to an embodiment of the present disclosure. In the following, the steps of the method will be described in detail in connection with FIG. 2 and FIG. 3.

In step S410, the user interface controlling module 210 is triggered in response to a signal input from the outside. The signal input from the outside is corresponding to a triggering event. For example, the triggering event can comprise a user touching a remote of the box, a user touching the display screen of the television, or the like. As a specific example, for example, the user can trigger the user interface controlling module 210 by touching numerical keys on the remote of the box.

After the user interface controlling module 210 is triggered, at step S420, the command transmitting module 220 transmits the adjusting command to the television 100.

Different adjusting commands are corresponding to different backlight brightness values. For example, the backlight brightness values can be divided into 12 levels or another number of levels. For example, if the backlight brightness value is divided into 12 levels, different adjusting commands are corresponding to backlight brightness values of any integer value between 0 and 12 respectively.

The command transmitting module 220 transmitting the adjusting command can comprise the command transmitting module 220 transmitting the adjusting command containing the backlight brightness value corresponding to the triggering event. The triggering even can for example be a user touching a remote of the box, a user touching the display screen of the television, or the like, as described in the above. For example, the triggering event is the user touching numerical key "5" on the remote. After the user triggers the user interface controlling module 210 through the above triggering event, the command transmitting module 220 transmits the adjusting command which contains a backlight brightness value "5" corresponding to the triggering event that the user triggers the numerical key "5" on the remote of the box.

The command transmitting module 220 is communicatively connected to the command generating module 110 of the television 100 through HDMI 300. The adjusting command transmitted by the command transmitting module 220 is transmitted to the command generating module 110 of the television 100 through HDMI 300. Pin 13 of HDMI is defined as the transmitting terminal, and pin 14 is defined as the receiving terminal.

After that, at the television side, the command generating module 110 of the television 100 can now be taken as a command receiving module to only receive the adjusting command from the command transmitting module 220 and transmit it to the backlight adjusting module 120.

The backlight adjusting module 120 of the television 100 adjusts the backlight of the display screen of the television 100 to corresponding brightness based on the adjusting command. For example, if the adjusting command is the adjusting command containing a backlight brightness value "5" as described in the above, the backlight adjusting module 120 adjusts the backlight of the display screen of the television 100 to brightness corresponding to the backlight brightness value "5" based on the adjusting command. Such brightness is the brightness needed by the user.

It should be realized that the operation and backlight brightness adjusting method of the above modules at the television side are well known in the art, which will not be described in detail herein.

The method according to the embodiment of the present disclosure can adjust the backlight brightness of a television by interaction between a box and existing modules of the television based on the user's need.

Figure 4:
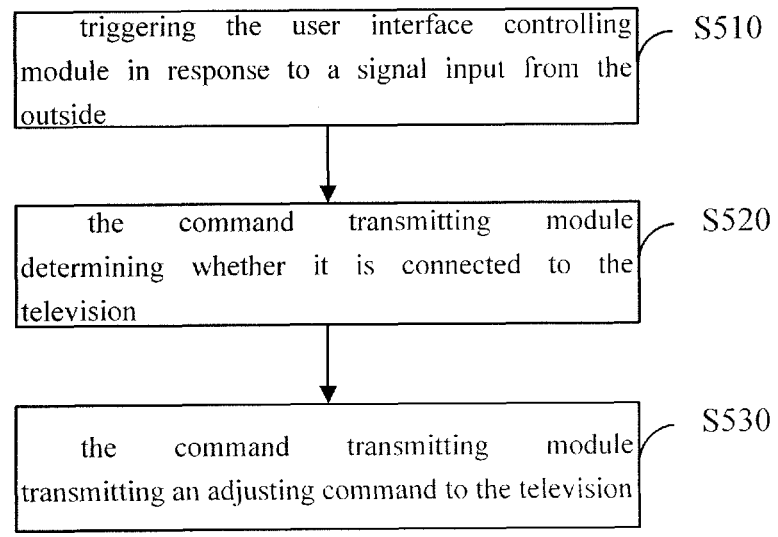
FIG. 4 is a flowchart of another method for adjusting backlight brightness of a television through a box according to an embodiment of the present disclosure.

FIG. 4 illustrates a flowchart of another method 500 for adjusting backlight brightness of a television by a box according to an embodiment of the present disclosure.

In the following, the steps of the method will be described in detail in connection with FIG. 2 and FIG. 4.

In step S510, the user interface controlling module 210 is triggered in response to a signal input from the outside. The signal input from the outside is corresponding to a triggering event. For example, the triggering event can comprise a user touching a remote of the box, a user touching the display screen of the television, or the like. As a specific example, for example, the user can trigger the user interface controlling module 210 by touching numerical keys on the remote of the box. Step S510 is corresponding to step S410 in FIG. 3.

After the user interface controlling module 210 is triggered, at step S520, the command transmitting module 220 determines whether it is connected to the television 100. If the determining result is no, no processing will be performed. If the determining result is yes, the following step S530 will be performed. The command transmitting module 220 can for example be communicatively connected to the command generating module 110 of the television 100 through HDMI 300.

In step S530, the command transmitting module 220 transmits the adjusting command to the television 100. Different adjusting commands are corresponding to different backlight brightness values. For example, the backlight brightness values can be divided into 12 levels or another number of levels. For example, if the backlight brightness value is divided into 12 levels, different adjusting commands are corresponding to backlight brightness values of any integer value between 0 and 12 respectively.

The command transmitting module 220 transmitting the adjusting command can comprise the command transmitting module 220 transmitting the adjusting command containing the backlight brightness value corresponding to the triggering event. The trigger even can for example be a user touching a remote of the box, a user touching the display screen of the television, or the like, as described in the above. For example, the triggering event is the user touching numerical key "5" on the remote. After the user triggers the user interface controlling module 210 through the above triggering event, the command transmitting module 220 transmits the adjusting command which contains a backlight brightness value "5" corresponding to the triggering event that the user triggers the numerical key "5" on the remote of the box.

The adjusting command transmitted by the command transmitting module 220 is transmitted to the command generating module 110 of the television 100 through HDMI 300. Pin 13 of HDMI is defined as the transmitting terminal, and pin 14 is defined as the receiving terminal.

Step S530 is corresponding to step S420 in FIG. 3.

After that, at the television side, the command generating module HO of the television 100 can now be taken as a command receiving module to only receive the adjusting command from the command transmitting module 220 and transmit it to the backlight adjusting module 120.

The backlight adjusting module 120 of the television 100 adjusts the backlight of the display screen of the television 100 to corresponding brightness based on the adjusting command. For example, if the adjusting command is the adjusting command containing a backlight brightness value "5" as described in the above, the backlight adjusting module 120 adjusts the backlight of the display screen of the television 100 to brightness corresponding to the backlight brightness value "5" based on the adjusting command. Such brightness is the brightness needed by the user.

It should be realized that the operation and backlight brightness adjusting method of the above modules at the television side are well known in the art, which will not be described in detail herein.

The method according to the embodiment of the present disclosure can adjust the backlight brightness of a television by interaction between a box and existing modules of the television based on the user's need.

Figure 5:
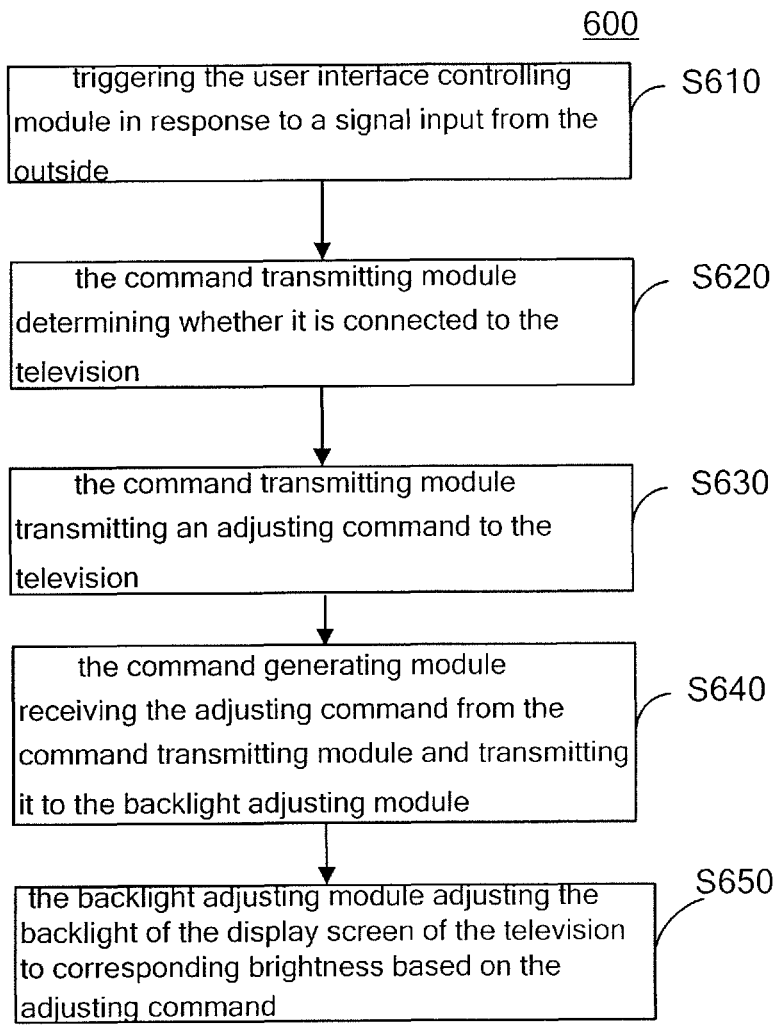
FIG. 5 is a flowchart of a specific procedure for adjusting backlight brightness of a television through a box according to an embodiment of the present disclosure.

FIG. 5 is a flowchart 600 of a specific procedure for adjusting backlight brightness of a television through a box according to an embodiment of the present disclosure. In the following, the interaction procedure between the box and television will be described in detail in connection with FIG. 2 and FIG. 5. Steps S610-S630 are operations at the box side, and steps S640-S650 are operations at the television side.

In step S610, the user interface controlling module 210 of the box 200 is triggered in response to a signal input from the outside. The signal input from the outside is corresponding to a triggering event. This step is corresponding to step S410 in FIG. 3 and S510 in FIG. 4.

After the user interface controlling module 210 is triggered, at step S620, the command transmitting module 220 determines whether it is connected to the television 100. If the determining result is no, no processing will be performed. If the determining result is yes, the following step S630 will be performed. This step is corresponding to step S520 in FIG. 4.

In step S630, the command transmitting module 220 of the box 200 transmits the adjusting command to the television 100. This step is corresponding to step S420 in FIG. 3 and step S530 in FIG. 4.

In step S640, the command generating module 110 of the television 100 is taken as a command receiving module to receive the adjusting command from the command transmitting module 220 and transmit it to the backlight adjusting module 120 of the television 100.

In step S650, the backlight adjusting module 120 adjusts the backlight of the display screen of the television 100 to corresponding brightness based on the adjusting command. Such brightness is the brightness needed by the user.

The above description is only specific implementation of the present disclosure. However, the protection scope of the present disclosure is not limited to this. Any change or replacement that can be easily thought of by those skilled in the art within the technical scope disclosed by the present disclosure should be covered by the protection scope of present disclosure. Therefore, the protection scope of the present disclosure should be defined by the protection scope of the claims.

The present application claims the priority of Chinese Patent Application No. 201510472407.9 filed on Aug. 4, 2015, entire content of which is incorporated as part of the present invention by reference.

What is claimed is:

1. A method for adjusting backlight brightness of a television through a box, the box comprising a user interface controlling module and a command transmitting module, the method comprising:
    triggering the user interface controlling module in response to a signal input from the outside, wherein the signal indicates the backlight brightness value for an adjusting command; and
    the command transmitting module transmitting the adjusting command containing the backlight brightness value corresponding to the triggering event to the television,
    wherein before transmitting the adjusting command containing the backlight brightness value corresponding to the triggering event to the television, the command transmitting module determines whether it is connected to the television, and transmits the adjusting command to the television if the determining result is yes.

2. The method according to claim 1, wherein the signal input from the outside is corresponding to a triggering event.

3. The method according to claim 2, wherein the triggering event comprises a user touching a remote of the box, and a user touching the display screen of the television.

4. The method according to claim 1, wherein different adjusting commands are corresponding to different backlight brightness values.

5. The method according to claim 1, wherein the adjusting command transmitted by the command transmitting module is transmitted to the television via HDMI.

6. The method according to claim 1, wherein the box is a set-top box.

7. The method according to claim 1, wherein the signal input from the outside is corresponding to a triggering event.

8. The method according to claim 1, wherein different adjusting commands are corresponding to different backlight brightness values.

9. A box for adjusting backlight brightness of a television, comprising:
    a user interface controlling module, configured to be triggered in response to a signal input from the outside, wherein the signal indicates the backlight brightness value for an adjusting command; and
    a command transmitting module communicatively connected to the user interface controlling module, configured to transmit the adjusting command containing the backlight brightness value corresponding to the triggering event to the television,
    wherein before transmitting the adjusting command containing the backlight brightness value corresponding to the triggering event to the television, the command transmitting module determines whether it is connected to the television, and transmits the adjusting command to the television if the determining result is yes.

10. The box according to claim 9, wherein the signal input from the outside is corresponding to a triggering event.

11. The box according to claim 10, wherein the triggering event comprises a user touching a remote of the box, and a user touching the display screen of the television.

12. The box according to claim 9, wherein different adjusting commands are corresponding to different backlight brightness values.

13. The box according to claim 9, wherein the adjusting command transmitted by the command transmitting module is transmitted to the television via HDMI.

14. The box according to claim 9, wherein the box is a set-top box.

* * * * *